(Model.)
J. B. MORGAN.
SUBTERRANEAN TELEGRAPH LINE.
No. 248,052. Patented Oct. 11, 1881.
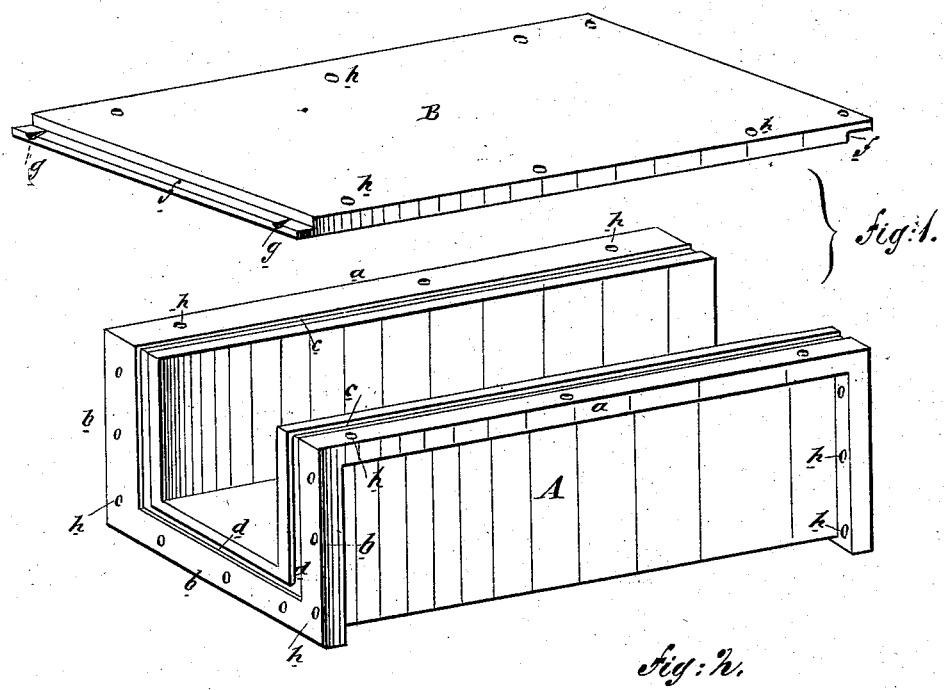
Fig. 1.
Fig. 2.
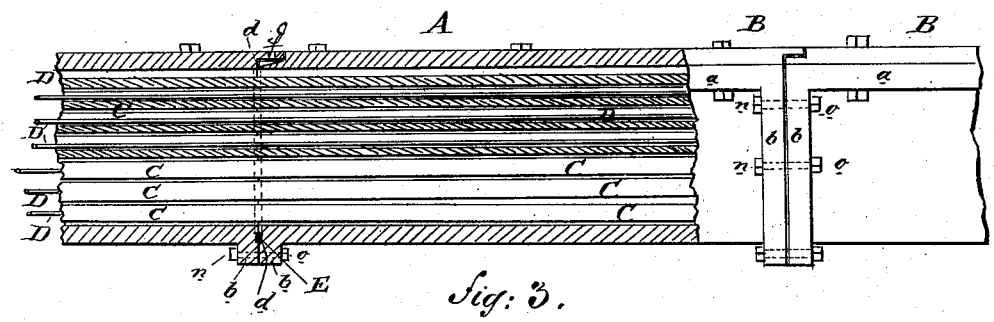
Fig. 3.
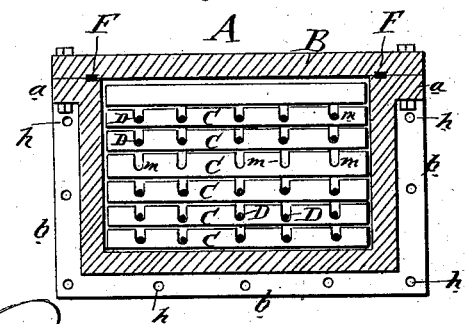
WITNESSES:
Chas. Nida.
G. Sedgwick.
INVENTOR:
J. B. Morgan
BY Munn & Co
ATTORNEYS.

UNITED STATES PATENT OFFICE.

JOHN B. MORGAN, OF KANSAS CITY, MISSOURI.

SUBTERRANEAN TELEGRAPH-LINE.

SPECIFICATION forming part of Letters Patent No. 248,052, dated October 11, 1881.

Application filed November 26, 1880. (Model.)

*To all whom it may concern:*

Be it known that I, JOHN B. MORGAN, of Kansas City, in the county of Jackson and State of Missouri, have invented a new and Improved Subterranean Telegraph - Line, of which the following is a specification.

The object of this invention is to provide a new method for holding telegraph-wires separate from each other, and properly insulated and protected in underground-lines.

Figure 1 represents a perspective view of a box and cover. Fig. 2 is a longitudinal partly-sectional elevation of several boxes united and containing telegraph-wires. Fig. 3 is a sectional end elevation of the same.

Similar letters of reference indicate corresponding parts.

In the drawings, A represents an iron box, preferably rectangular, open at both ends, having outwardly-extending flanges $a\ a$ along its upper edges, and corresponding flanges, $b\ b$, at its ends, all of which flanges $a\ b$ are longitudinally grooved, as shown at $c\ d$ respectively, for holding the leaden gaskets or seals with which the covers B are sealed or jointed to the said boxes A, and with which the boxes A themselves are jointed to each other.

B represents a flat box-cover, having its ends scarfed, as shown at $f$, for overlaying and underlaying connecting covers and forming suitable joints therewith, and in one end of each cover B are formed ingates $g\ g$, through which the molten lead is to be poured for sealing the covers B to the boxes A. The flanges of the boxes A and the edges of the covers B are provided with suitable bolt-holes, $h\ h$, for the bolts that are to hold them to each other.

Within the boxes A are placed, one above another, boards C thoroughly saturated with paraffine or other non-conducting oils or waxes for the purpose of protecting them from decay, while at the same time increasing the insulation of the wires, and these boards C are provided on their upper faces with longitudinal parallel grooves $m$, in which the wires D are laid in such a manner that they shall not come in contact with each other, shall be properly insulated, and be subject to a minimum of induction.

In the drawings, the boxes A and wires D are represented as laid in straight lines; but it is evident that the same relative conditions may be retained when arranging boxes and wires for turning at any desired angle. The boxes A, being suitably arranged end to end in trenches, are bolted together by bolts $n$ passing through their flanges $b\ b$ and secured by nuts $o$, and melted lead is then poured from above into the grooves $d$ to form the gaskets or seals E and thereby make the joints between the said boxes A impervious to moisture. The boards C are then laid in place, (as many of them as may be required,) and the wires D are then stretched along in the board-grooves $m$, each wire being thereby held separate from the others. The covers B are then fastened down on the boxes A by suitable bolts and nuts, and melted lead is then poured into the ingates $g\ g$ to form the gaskets or seals F, that make tight joints between the boxes A and covers B. Boxes A and boards C of any desired length may be used.

The method of laying the lines is substantially as follows: The boxes A B are placed in trenches and securely sealed at the end joints, and then a layer of the boards C is put in place and wires D are laid in the grooves thereof, and then a brush that has been dipped in melted paraffine or other wax is passed over the surfaces both of boards and wires. The same process is followed until the box is filled. This thoroughly insulates the wires and separates them from each other. The oil or wax applied in this manner not only insulates the wires, but acts as a seal between the surfaces of the boards. The design is to fill the boxes with wires, although all the wires would not be required for use at the time of laying them, thus arranging a reservoir, as it were, of wires to draft upon when required. When the wires and boards are all arranged in this manner the tops or covers of the boxes are put in position and sealed.

Having thus fully described my invention, I claim as new and desire to secure by Letters Patent—

The combination of the metallic box A, having longitudinal flanges $a\ b$ grooved at $c\ d$, the flat cover B, having its ends scarfed at $f$, and provided with end gates, $g$, and the boards C, saturated with paraffine, and having grooves $m$, whereby wires may be insulated and protected, as described.

JOHN BENJAMIN MORGAN.

Witnesses:
J. P. MITCHENER,
JNO. E. HALE.